March 9, 1943.    C. L. DAUN    2,313,226
DISPENSER FOR CARBONATED BEVERAGES
Filed Nov. 22, 1940
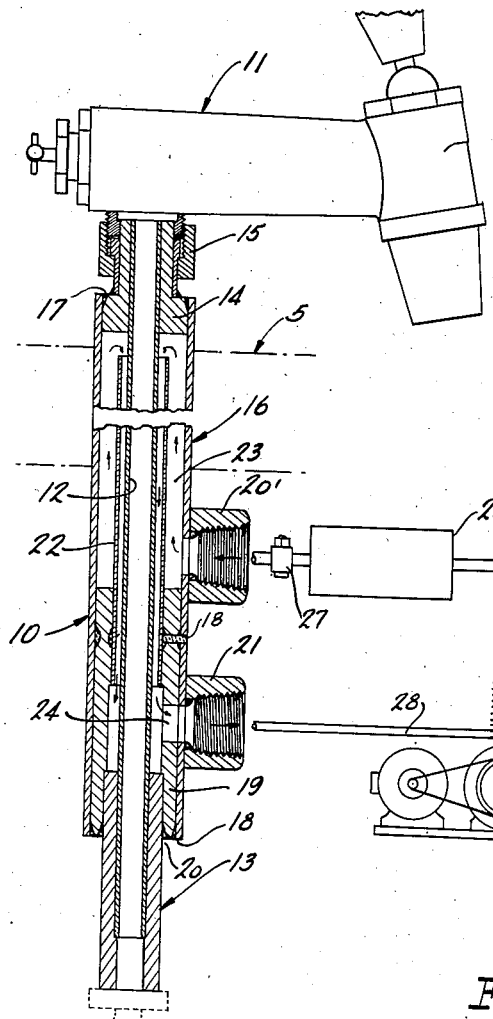
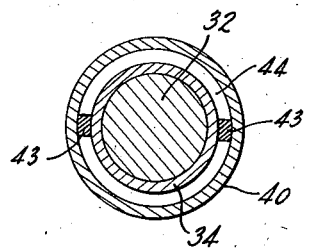
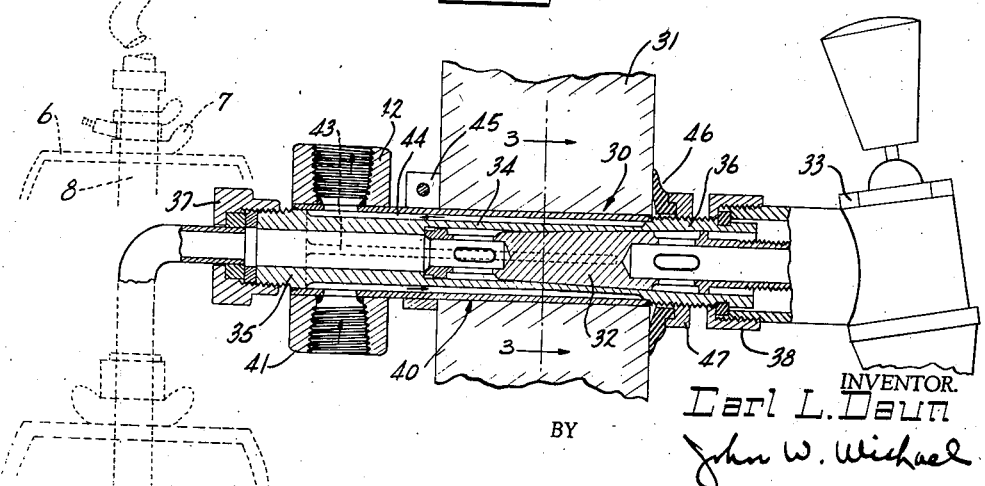
INVENTOR.
Carl L. Daun
BY John W. Michael
ATTORNEY Patented Mar. 9, 1943

2,313,226

UNITED STATES PATENT OFFICE 2,313,226

DISPENSER FOR CARBONATED BEVERAGES

Carl L. Daun, Milwaukee, Wis.

Application November 22, 1940, Serial No. 366,587

1 Claim. (Cl. 225—40)

This invention relates to a beverage dispenser especially designed and adapted for dispensing carbonated beverages, such as beer or the like.

Various methods are in use for cooling and dispensing carbonated beverages such as beer.

In the so-called "direct draw" boxes, the beer is cooled in its keg or container either by precooling or by refrigeration in a compartment of the box which receives the keg, or by both, or else is cooled by means of a rerefrigerated tap rod of the character disclosed and claimed in my application for "Method of and means for cooling liquids," filed October 18, 1939, Serial No. 299,933, and the cooled beer is conducted from the keg through a relatively short beer line or an extension of the tap rod to the dispensing faucet disposed at or adjacent the top of the bar.

In the so-called "basement draw," or in installations where the refrigerating compartment is located on the same floor but at some distance from the bar, the beer line between the tap rod of each keg and its faucet is of considerable length, and it is usually desirable, if not necessary, to refrigerate such beer lines.

In all of these instances, however, each dispensing faucet, and a section of the beer line connected thereto, even though such section be short, are not refrigerated and are exposed to room temperature so that the beer in the faucet and in the adjacent part of its beer line may increase in temperature and become warm, and especially so if the beer is not drawn from the faucet continuously. The beer that stands in the faucet, and in the adjacent section of the beer line, and which becomes warm, is rendered unwholesome and unpalatable, and also is likely to foam excessively when drawn. Furthermore, draft beer is unpasteurized and when allowed to become warm is apt to undergo renewed fermentation with consequent undesirable increase in bacteria content.

One of the objects of the present invention is to provide a dispenser in which the faucet and the section of the beer line adjacent and connected thereto are so constituted and combined with each other that the beer therein will be kept at the proper temperature even though left standing therein for a protracted period. The quality and flavor of the beer is preserved indefinitely, renewal of fermentation prevented, and excessive foaming and consequent waste when the beer is drawn is precluded.

Another object of the invention is to provide a dispenser of this character which is simple, compact, and closely organized in construction, reliable and efficient in operation, and easy and comparatively inexpensive to manufacture, install, and maintain.

Other objects and advantages reside in certain novel features of the construction, arrangement, and combination of parts, which will be hereinafter more fully described and particularly pointed out in the appended claim, reference being had to the accompanying drawing forming a part of this specification, and in which:

Figure 1 is a view partly in side elevation, partly in central, vertical cross section, and partly in diagrammatic, showing a beer dispenser embodying the present invention and illustrating diagrammatically how it is hooked up in the system;

Figure 2 is a similar view but showing the invention embodied in the horizontal type of draw; and Figure 3 is a view in transverse, vertical cross section taken on line 3—3 of Figure 2.

Referring to the drawing, and more particularly to Figure 1, a fragment of the refrigerator or draw-box is indicated diagrammatically at 5. Within the draw-box a keg or barrel 6 is disposed and contains the cooled beer or other carbonated beverage to be dispensed. The barrel or keg 6 is provided with the tap fitting 7 through which a tap rod 8 is introduced in the conventional manner. In the form of the invention shown in Figure 1, the dispenser embodying the present invention is designated as a whole at 10 and extends vertically from the tap rod through the top of the draw box to a dispensing faucet 11 of any suitable or conventional construction.

The dispenser 10 comprises a beverage tube 12 constituted of metal of high thermal conductivity, and preferably thin-walled so as to provide for the rapid and efficient interchange of heat between the beverage in the tube 12 and the cooling medium on the outside thereof. At the lower end of the tube a suitable connector 13 is secured to adapt the lower end to be coupled in any appropriate way, as by means of a flexible pipe, or the like, to the upper end of the tap rod 8. The upper end of the beverage tube is also provided with a connector designated at 14, and which may be provided with a suitable coupling 15 to facilitate its attachment to the dispensing faucet 11. The connector 14, coupling 15, and the body of the dispensing faucet 11 are constituted of metal of good thermal conductivity, and are in such intimate and effective contact that the cooling effect of the cooling medium upon beverage tube 12 and connector 14 is transmitted by conduction to the body of the faucet 11. An annular metallic jacket 16 surrounds the beverage tube 12 and at its upper end telescopes over and is welded, as at 17, to the lower enlarged end of the connector 14. The jacket is not only secured to the connector but is hermetically sealed thereto. The lower end of the jacket is also secured and hermetically sealed to the connector 13, but this is accomplished indirectly, the lower end of the jacket being welded, as at 18, to the lower end of a barrier 19, which in turn is welded, as at 20, to the connector 13. The barrier 19 is interposed between an inlet fitting 20' and an outlet fitting 21, which are carried by the jacket, and its purpose is to prevent direct flow of the cooling medium from the inlet to the outlet fittings.

The jacket 16 coacts with the tube 12 and with a baffle tube 22 to provide a passage-way 23 through which the cooling medium circulates. The baffle tube 22 is an open-ended tube which extends for a substantial part of the length of the beverage tube. Its lower end is fitted in and secured to the barrier 19 so that the barrier serves not only the function of a barrier but also a support for its baffle tube. The barrier is preferably welded to the baffle tube. A port 24 is provided in the barrier in alinement with the opening of the outlet fitting 21.

The construction as thus far described may be combined with any suitable type of refrigerating system. One type is diagrammatically shown in Figure 1 and is a conventional vapor compression machine which has the compressor 25, condenser and receiver 26, and expansion valve 27. The outlet of the expansion valve is connected to the inlet fitting 20' of the jacket, whereas the outlet fitting 21 of the jacket is connected to the suction line 28 of the compressor. With a construction of this character the cooling medium is constrained to flow through the inlet fitting 20' into the passage 23, thence upwardly in the passage 23 between the baffle tube 22 and the jacket 16, and then reversely down through the portion of the passage 23 between the baffle tube 22 and the beverage tube 12 to the outlet fitting 21. The beverage tube 12 is thus effectively chilled throughout its entire length so as to maintain the beverage therein at the proper temperature. Moreover, the jacket becomes frosted up and this produces an effect of pleasing coolness which makes the service of a glass of beverage from the dispenser inviting and appetizing. The cooling medium also acts directly on the connector 14 to chill the same, and, as indicated, the cooling effect exerted by the cooling medium on the tube 12 and connector 14 is transmitted by conduction to faucet 11.

The form of the invention shown in Figure 2 is substantially the same as far as the cooling of the beverage is concerned, but it is adapted to the so-called horizontal type of draw, that is one wherein the beverage dispenser, designated generally at 30, extends horizontally through a wall 31 of the draw-box or cooler. Moreover, in this type of structure the flow restrictor 32, which is combined with a dispensing faucet 33, and which per se forms no part of the present invention, may be combined directly with the beverage tube, designated at 34, the latter being constructed, as before, of metal of high thermal conductivity. In this form of the invention the beverage tube is provided at its ends with connectors 35 and 36, designed to facilitate the coupling of the tube to a tap rod and to the faucet 33, respectively, but in this instance these connectors may be advantageously formed as integral parts of the beverage tube, and, of course, they have suitable couplings 37 and 38 combined therewith to enable them to completely serve their purposes.

As in the other embodiment of the invention, a jacket 40 surrounds the beverage tube and its ends are welded to or otherwise suitably fastened and sealed to the connectors 35 and 36. Inlet and outlet fittings 41 and 42 are combined with the jacket 40 and provide for the supply and exhaust of the cooling medium to the passage-way 43 defined between the jacket and the beverage tube.

In this form of the invention the baffle means, which constrains the cooling medium to reversely flow through the passage-way between the jacket and the tube, and along the full length of the tube, instead of being constituted of a barrier, such as the barrier 19 and a baffle tube 22, comprises two diagrammatically opposite baffle strips 43, which extend from the connector 35 lengthwise of the dispenser to a point adjacent to but slightly spaced from the connector 36. These baffle strips 43 are sealed to both the outer periphery of the beverage tube 34 and the inner periphery of the jacket 40, as well as to connector 35, and they are disposed intermediate the points at which the inlet and outlet fittings 41 and 42 communicate with the passage-way 44, so as to constrain the cooling medium to flow from the inlet fitting 41 along the lower half of the passage-way 44 and then around the ends of the baffle strips 43, and then reversely flow back through the upper half of the passage-way 44 to the outlet fitting 42.

The jacket 40 is held in place in the opening provided therefor in the wall 31 by means of a suitable clamp 45 releasably secured to the packet and abutting the inner face of the wall 31, and by means of an escutcheon plate 46 and nut 47, the escutcheon plate 46 abutting the outer face of the wall 31 and the nut 47 being threaded on the connector 36 and clamping the parts in proper position in the assembly. As in the other embodiment of the invention, the cooling medium not only cools the beer as it flows through the beverage tube 34, and maintains it appropriately cool while it stands therein, but the cooling effect of the cooling medium is transmitted by conduction to the connector 36 and coupling 38 to the body of the faucet 33 to chill the body of the faucet and keep the beer therein appropriately cool.

In both embodiments of the invention the means which controls the circulation of the refrigerant through the dispenser does so in such a special way as to insure maximum efficiency and precludes the possibility of the gas being trapped. In the form of the invention shown in Figure 1 this is accomplished by supplying the refrigerant through the inlet fitting 20' to the lower end of the space between the jacket 16 and the baffle tube 22. As the liquid refrigerant vaporizes, the vapor passes over the top of the baffle tube and down through the restricted space between the baffle tube 22 and the beverage tube 12, this space being so restricted as to effectively prevent any liquid from flowing down therethrough past the gas.

In the form of the invention shown in Figure 2, the same action is had by supplying the liquid refrigerant to one end of the lower half of the passage 44. As the liquid vaporizes the vapor passes through the restricted passage-ways around the ends of the baffle strips 43 and then through the upper half of the passage 44 to the outlet fitting 42. Here again the passage around the ends of the baffle strips is so restricted that the liquid cannot flow past the gas and trap the gas in the dispenser. The liquid in both instances is always behind the gas and pushes it through the passages in which it is circulated.

While I have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claim.

I claim:

A beverage dispenser comprising a beverage tube, enlarged end portions on said tube, external threads on said end portions providing means for coupling said tube to a faucet and a tap rod, one end of said tube being interiorly enlarged to form a portion of a flow restrictor, an annular jacket surrounding said tube and having its ends overlapping and hermetically sealed to said enlarged end portions, said jacket coacting with said tube to define a passage-way through which a cooling medium may be circulated, inlet and outlet fittings angularly spaced and provided on the jacket adjacent one end thereof, and angularly spaced baffle partitions extending longitudinally of said tube and jacket and extending between the outer periphery of the tube and the inner periphery of the jacket, said partitions being located intermediate said inlet and outlet fittings and extending from one enlarged end portion to a point adjacent to but spaced from the other enlarged end portion.

CARL L. DAUN.